United States Patent
Woolf et al.

(10) Patent No.: US 9,275,261 B2
(45) Date of Patent: Mar. 1, 2016

(54) CHIP-AND-PIN READER DEVICE

(71) Applicant: Powa Technologies Limited, London (GB)

(72) Inventors: Jeffrey Moss Woolf, London (GB); David Paul Ingram, London (GB); Daniel Maurice Wagner, London (GB)

(73) Assignee: POWA Technologies Limited, London (GB)

( * ) Notice: Subject to any disclaimer, the term of this patent is extended or adjusted under 35 U.S.C. 154(b) by 0 days.

(21) Appl. No.: 14/395,649

(22) PCT Filed: Apr. 22, 2013

(86) PCT No.: PCT/GB2013/051013
§ 371 (c)(1),
(2) Date: Oct. 20, 2014

(87) PCT Pub. No.: WO2013/156799
PCT Pub. Date: Oct. 24, 2013

(65) Prior Publication Data
US 2015/0076230 A1    Mar. 19, 2015

(30) Foreign Application Priority Data
Apr. 20, 2012 (GB) .................................. 1207061.1

(51) Int. Cl.
*G06K 19/00* (2006.01)
*G06K 7/00* (2006.01)

(52) U.S. Cl.
CPC ............ *G06K 7/0069* (2013.01); *G06K 7/0004* (2013.01); *G06K 7/0013* (2013.01); *G06K 7/0026* (2013.01); *G06K 7/0065* (2013.01)

(58) Field of Classification Search
USPC .......................................... 235/487, 492, 494
See application file for complete search history.

(56) References Cited

U.S. PATENT DOCUMENTS

| | | | |
|---|---|---|---|
| 5,912,618 A | 6/1999 | Maugars | |
| 6,234,844 B1 | 5/2001 | Somerville et al. | |
| 6,454,164 B1 * | 9/2002 | Wakabayashi et al. | ....... 235/380 |
| 7,385,827 B2 | 6/2008 | Klatt | |
| 2004/0172558 A1 * | 9/2004 | Callahan et al. | .............. 713/201 |

(Continued)

FOREIGN PATENT DOCUMENTS

| | | |
|---|---|---|
| DE | 20 2004 000 179 U1 | 4/2004 |
| DE | 102005056862 A1 | 6/2007 |

(Continued)

OTHER PUBLICATIONS

European Communication, Application No. 13 718 218.4, mailed Nov. 9, 2015, 4 pages.

*Primary Examiner* — Matthew Mikels
(74) *Attorney, Agent, or Firm* — Kagan Binder, PLLC

(57) ABSTRACT

The invention provides a chip-and-PIN reader device having a slot for accommodating a chip-and-PIN card, a set of electrodes adapted to come into contact with corresponding electrodes on the card when the card is inserted into the slot, and a means for ensuring correct registration between the electrodes on the card and the set of electrodes of the reader device. The means for ensuring correct registration may include two orthogonally disposed walls of the slot, against which the card is pushed. Alternatively, the means may include a pair of electrodes on each side of the set of electrodes of the reader, which are short-circuited when the chip electrodes are not correctly registered with the reader electrodes. The short-circuit is flagged to the user of the card. The reader may also be equipped to read an MSR-type device.

5 Claims, 2 Drawing Sheets

(56) References Cited

U.S. PATENT DOCUMENTS

| | | | |
|---|---|---|---|
| 2006/0007160 A1* | 1/2006 | Lutnick et al. ............... 345/168 |
| 2011/0035604 A1 | 2/2011 | Habraken | |

FOREIGN PATENT DOCUMENTS

| | | |
|---|---|---|
| EP | 0 254 316 A2 | 1/1988 |
| EP | 0254316 A2 | 1/1988 |
| EP | 0 363 871 | 4/1990 |
| EP | 0 791 890 A2 | 8/1997 |
| EP | 0791890 A2 | 8/1997 |
| GB | 2304220 A | 3/1997 |
| WO | 90/04239 | 4/1990 |
| WO | 9004239 A1 | 4/1990 |

* cited by examiner

CHIP-AND-PIN READER DEVICE

CLAIM OF PRIORITY

The present application claims priority to International Application No. PCT/GB2013/051013, filed on Apr. 22, 2013, which in turn claims priority to and the benefit of GB Application No. 1207061.1, filed on Apr. 20, 2012, the disclosures of which are hereby incorporated by reference in their entireties.

The invention relates to a chip-and-pin reader device for use in a commercial transaction system, in which a PIN entered by a carrier of a chip- and PIN credit, debit, charge, payment or loyalty card, or similar, is required to be authenticated before a commercial transaction can take place.

Card readers are well known and generally take three forms: firstly, a magnetic strip reader (MSR), in which a card with a magnetic strip is swiped across a sensor, which then reads the data on the card, authentication being carried out using the customer's signature which is compared to a reference signature on the back of a credit card in order to ascertain identity; secondly, a chip-and-PIN reader, in which a card with a chip is inserted into the reader, so that electrodes of the reader make contact with electrodes of the chip, the card data on the chip being then read; thirdly, a near-field communications reader (NFC), which is mainly used for transactions valued at £15 or less. In the second of these cases it is necessary for the carrier of the card to input their PIN for the sake of authentication. Only if the PIN is authenticated can the transaction then go ahead.

An example of an MSR system is described in United States Patent Application published as US 2011/0180601. In this system the reader is a device having a slot for accommodating the card and a jack plug for mating with a jack socket provided in a mobile communications device. The reader comprises a read head connected to the jack plug. Swiping the card in the slot induces a signal in the read head, which is passed to the mobile communications device via the jack plug and socket. For such induction to occur, the card is inserted so that the magnetic strip passes directly over the reader.

A commercial example of such an MSR system is the Square™ system, which makes use of a so-called dongle. This has the slot and jack plug arrangement described in US 2011/0180601. The jack plug mates with a headphone jack socket in a mobile communications device.

Due to perceived insecurities inherent in the MSR system, the tendency nowadays is to use the chip-and-PIN system.

Chip-and-PIN readers are ubiquitous in, e.g., restaurants and many other establishments. The reader has a slot for accommodating a chip card, with electrodes in the reader making contact with corresponding electrodes on the card. A keyboard is provided, via which the customer enters their PIN number. Once the PIN has been authenticated, a modem device in the reader sends the information on the card to a remote server, which then debits the credit or debit card account of the customer. A print roll is often provided for the purpose of printing out a receipt for the customer.

A problem with this known chip-and-PIN reader is that it is large and bulky and cannot be easily carried about the person. Consequently, it is usually kept at a central location in, e.g., a restaurant and brought over to the customer when it is time to pay.

In accordance with a first aspect of the present invention, there is provided a chip-and-PIN reader, comprising: a slot for the insertion of a chip card; a plurality of keys including numeric keys 0-9; a set of electrodes adapted to come into contact with corresponding electrodes on the chip card; a reading means connected to the set of electrodes for reading the entered PIN and for reading the card-number data stored on the chip; a comparing means for comparing the PIN entered by the user with the PIN stored on the chip and for providing a signal indicative of a wrong entered PIN; an encryption means for encrypting said card-number data; and a wireless transmitter for transmitting the encrypted card-number data to a mobile communications device.

The reader device may also be provided with an enter key and a restart key, the enter key being adapted to indicate to the device the completion of the entering of the PIN by a user of the device using the numeric keys, and the restart key being adapted to indicate to the device that a mistake has been made in entering the PIN; and a restart means for, following operation of the restart key, allowing a new entry of the PIN into the device.

The plurality of keys may be virtual keys displayed on a touch-sensitive display.

The reader device may comprise an indicator device, which is adapted to provide feedback to the user of the reader device, indicating that the keys have been pressed correctly. The indicator device may operate following each press of the keys, and following an output of said signal indicative of a wrong entered PIN. the indicator device may be a light-emitting element having two different colours, a first of said colours indicating the successful entering of each digit of the PIN number and a second of said colours indicating a wrong entered PIN.

The reader device may comprise a tab, whereby the device can be fitted onto a keyring.

The reader device may comprise a means for ensuring correct registration between the electrodes on the card and the set of electrodes of the reader device. The means for ensuring correct registration may comprise two orthogonally disposed walls of the slot, against which, in use, the card is pushed by the user of the reader device. Alternatively, the means for ensuring correct registration may comprise a pair of electrodes on each side of the set of electrodes of the reader device, the reader device being adapted to detect a short-circuit of either of the two pairs of electrodes, due to a chip electrode contacting said pair of electrodes, and to signal said short-circuit to the user of the reader device. The short-circuit may be signalled by the light-emitting element showing the second of the two different colours and/or by a "fail" signal, which is sent to the mobile communications device.

The slot of the reader device may have a width less than that of the card.

In a second aspect of the present invention, a commercial transaction system comprises: a chip-and-PIN reader device as described above; said mobile communications device; and a server for storing data relating to customers of said merchant; the system being adapted so that: the mobile communications device receives the encrypted card-number data from the reader device; the mobile communications device sends the encrypted card-number data and the cost of the goods to the server; and the server debits the user's card account with the cost of the goods.

The mobile communications device may include a camera function, and the system may be adapted so that: at a first transaction involving a particular customer, assuming that the PIN is entered correctly, a first photograph of that customer is taken by the camera function and data representing said first photograph is sent to the server, where it is stored together with the encrypted card-number data of the card being used by that customer; at a subsequent transaction involving the same card with any merchant using the system or any connected system, the photograph data is retrieved from the server by the mobile communications device and displayed for comparison by the merchant with the appearance of the customer using the reader device; if the retrieved photograph is a sufficiently good match to the customer's appearance, the merchant can proceed with the transaction.

Alternatively, the mobile communications device may include a camera function, and the system may be adapted so that: at a first transaction involving a particular customer, assuming that the PIN is entered correctly, a first photograph of that customer is taken by the camera function and data representing said photograph is sent to the server, where it is stored together with the encrypted card-number data of the card being used by that customer; at a subsequent transaction involving the same card with any merchant using the system or a connected system, a second photograph is taken by the user of the card and data representing this photograph is sent to the server; the server compares the first and second photographs using face-recognition software; the server then sends to the mobile communications device an indication of the goodness of the match between the first and second photographs; if the match is sufficiently good, the merchant can proceed with the transaction.

Preferably the data representing the first photograph is encrypted before being stored on the server.

The commercial transaction system may include a biometric sensor for sensing a biometric parameter of a customer, and the system may be adapted so that: at a first transaction involving the customer, assuming that the PIN is entered correctly, the biometric sensor is used to sense said parameter and a first data of said sensed parameter is sent to the server, where it is stored together with the encrypted card-number data of the card being used by that customer; at a subsequent transaction involving the same customer with any merchant using the system or any connected system, the said first data is retrieved by the mobile communications device from the server for comparison by the merchant with the same biometric parameter of the customer using the reader device; if the retrieved first data is a sufficiently good match to the customer's biometric parameter, the merchant can proceed with the transaction.

In a third aspect of the present invention, a commercial transaction system comprises: a card reader device; a biometric sensor, and a server for storing data relating to customers of said merchant; the system being adapted so that: at an initial transaction with a customer, assuming that the PIN is entered correctly, the card reader device reads from the customer's card the card-number data of that card and a first biometric parameter of the customer is taken by the biometric sensor; said card-number data and first data representing said first biometric parameter are sent encrypted to said server, where they are stored; at a subsequent transaction involving the same customer with any merchant using the system or a connected system, the customer's same biometric parameter is read by the biometric sensor and second data representing that biometric is sent to the server; the server attempts to find a match between the first and second data; if a sufficiently good match is found, the subsequent transaction is completed in relation to the customer.

A commercial transaction system may include a biometric sensor for sensing a biometric parameter of a customer, and the system may be adapted so that: at a first transaction involving the customer, assuming that the PIN is entered correctly, the biometric sensor is used to sense said parameter and first data representing said sensed parameter is sent to the server, where it is stored together with the encrypted card-number data of the card being used by that customer; at a subsequent transaction involving the same card with any merchant using the system or a connected system, the same biometric parameter of the customer is taken again by the biometric sensor and second data representing said biometric parameter is sent to the server, the server compares the first and second data using image-recognition software; the server then sends to the mobile communications device an indication of the goodness of the match between the first and second data; if the match is sufficiently good, the merchant can proceed with the transaction.

Again, preferably at least the first data is encrypted before being stored on the server.

The biometric sensor may be a camera facility of the mobile communications device.

In a further aspect of the present invention a chip-and-PIN reader device comprises: a slot for accommodating a chip-and-PIN card; a set of electrodes adapted to come into contact with corresponding electrodes on the card when the card is inserted into the slot; and a means for ensuring correct registration between the electrodes on the card and the set of electrodes of the reader device.

Embodiments of the present invention will now be described with the aid of drawings, of which:

Figure 1:
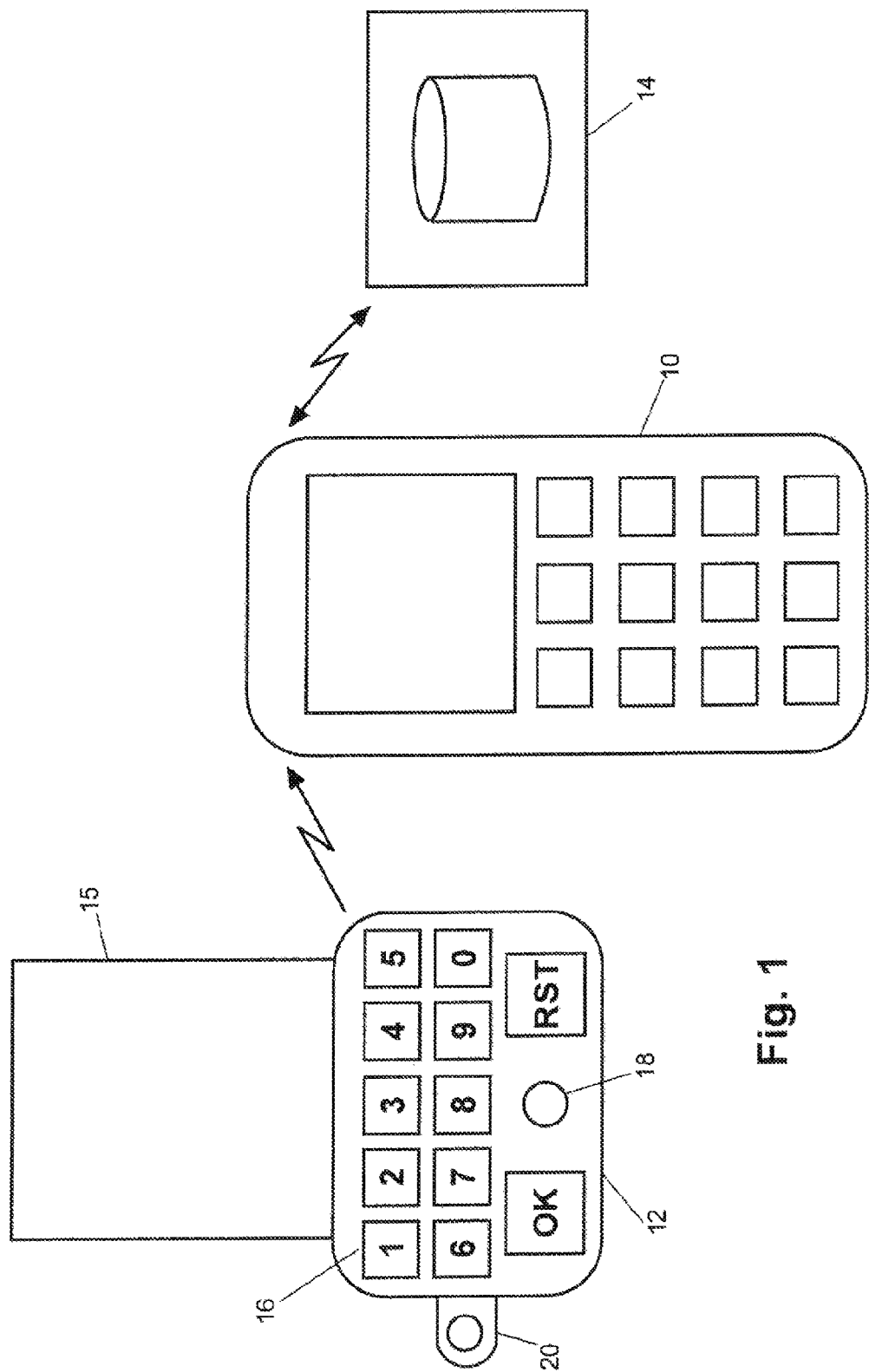
FIG. 1 shows a first embodiment of a commercial transaction system in accordance with the present invention.

Referring to FIG. 1, this shows a first embodiment of a card transaction system in accordance with the present invention. The system comprises a mobile communications device 10, a chip-and-PIN reader device 12 and a server 14. The device 12 communicates preferably unidirectionally with the device 10 (e.g. by Bluetooth™), while the device 10 communicates bi-directionally by wireless with the server 14. At least the devices 10 and 12 are controlled by a merchant, who may be a major retail company or an individual running a small business. A customer wishing to buy an item on sale takes out his credit or debit card 15 and inserts it into a slot provided in the device 12. This action preferably turns on the device 12. He then enters his PIN number using a keyboard 16 on the front face of the device 12. The keyboard in this embodiment is a hardware keyboard comprising a set of discrete keys. These are numerals 0-9, an enter button, which may be designated as an "OK" button, and a restart button, which may be designated as a "RST" button, as shown. A light-emitting element (e.g. a LED) may also be provided for reasons to be described below. Instead of discrete keys a membrane keyboard may be used, or a touch screen displaying virtual keys.

Assuming a 4-digit PIN is used, once the customer has keyed in all four digits, he then presses the OK button. The device 12 then checks the entered PIN against the correct PIN stored in the chip. If these match, the device 12 sends to the mobile communications device 10 a signal indicating a correct match to the merchant. In addition, the LED 18 may show a first colour, e.g. green. This informs the customer that the PIN is correct. The device 12 then reads the card information from the chip. The card information includes the card number on the front of the card, the expiry date and the three-digit number on the back of the card. This information is encrypted and then sent by Bluetooth™ or other wireless communications method to the mobile device 10. A dedicated "app" (software application) on the mobile takes this information and passes it on, again in encrypted form, to the server, where it is used to debit the appropriate amount for the goods on sale from the customer's card account.

It is possible that the customer will make a mistake in entering the PIN, or may enter the wrong PIN altogether. The latter might especially apply if the customer does not own the card, but is using it fraudulently. In that case, the customer can simply press the RST button, which will reset the operation of the reader device 12, allowing the correct (or at least another) PIN to be entered. If the PIN is not the correct PIN, the device 12 sends a signal to the mobile communications device 10 indicating a failed match. The device 12 may also operate the LED 18 to light a different colour, e.g. red, (though different colours may be used instead of green and red, for the benefit of the colour-blind). Thus the merchant and the customer are alerted to the fact that the PIN has not been authorized. Lack of authorization results in the transaction not being completed—that is, no card information is sent to the mobile communications device, merely a "fail" signal.

The LED 18 can also be used to provide the customer with feedback, ensuring him that his key presses are being registered. In this case, after each successful key press the LED 18 can momentarily light green. This applies to both presses of the numeric keys and presses of the OK and RST buttons. A distinction may be made between a show of green as a feedback indication and a show of green as an indication of a correct PIN. For the former the LED can be arranged to show a short green light (e.g. 0.5 sec), while for the latter it can be arranged to show a longer green light (e.g. for 1.5 or 2 secs).

The LED may also be used to indicate multiple other device-status messages, e.g. power status, pairing status, tamper evidence, etc.

As an alternative to using a hardware keypad, the present invention envisages the use of a virtual keypad or other number entry method. The virtual keypad takes the form of a touch-sensitive display, which displays the same keys shown in FIG. 1. Operation of the keys in this case takes place by tapping on the display. In one configuration the display may also be used to display other information such as instructions or branding. Since the reader device 12 need have only the keys and light-emitting element shown in FIG. 1 and a relatively simple processing facility, it can be made small, small enough indeed to be carried on a keyring. To this end the device 12 may include a tab 20 with a hole allowing the device to be fitted on the keyring.

In the embodiment shown in FIG. 1, the reader device 12 is wide enough for the slot to take the whole of the width of the card. This slot of this version of the device 12 is defined by three walls: two parallel with the long sides of the card and one parallel with its short sides. This configuration allows the card to sit snugly in the slot, leading to a well-defined registration of the chip electrodes with the electrodes (not shown) in the slot which are required to form a reliable electrical contact with the chip electrodes. However, other configurations are envisaged by the present invention.

Figure 2:
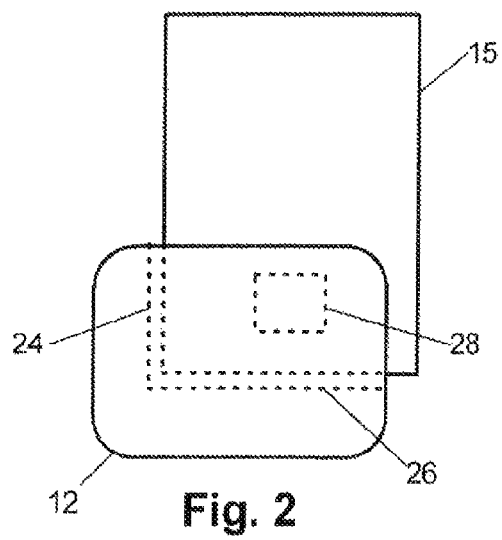
FIG. 2 shows one form of a card-seating arrangement in a reader device as employed in a commercial transaction system in accordance with the present invention.

In one alternative configuration there is no fully bounded slot, but a slot that is bounded by two walls only (see FIG. 2). These are orthogonally disposed walls 24 and 26. In this case the card 15 is inserted so that, for example, its lower left corner abuts the junction between the slot walls 24, 26. In this position the chip 28 of the card exactly registers with the electrodes (not shown) provided in the device 12, leading to a reliable operation of the reader device.

In another alternative configuration (see FIG. 3) the device 12 has a width less than that of the card 15. As in the previous configurations it is necessary for the chip electrodes to be exactly registered with the electrodes of the device 12. This is a potential problem in this configuration, however, since the slot is defined by one wall only, namely wall 30. In order to overcome this potential problem, the present invention envisages the use of a means for ensuring correct registration. An example of such a means is illustrated in FIG. 4. FIG. 4 shows the device 12 with its set of electrodes 32, which are to register with the chip electrodes of the card. Provided on each side of the set of electrodes 32 is a pair of electrodes 34. These electrode pairs 34 are configured so that they are short-circuited by one or more chip electrodes on the card when the card is offset from its correct position in either of the directions shown by the arrow 36. Only one of these electrode pairs 34 will be short-circuited at any one time, since the card cannot be simultaneously offset in the lefthand direction and in the righthand direction. When the electrode pairs 34 are short-circuited, a signal is provided by the circuitry in the device 12 alerting the merchant to the fact that the card is not correctly seated. The merchant then merely moves the card in the opposite direction 36 so as to remove the offset, upon which the signal disappears.

A convenient way of generating the above card-offset signal is to cause the LED 18 (not shown in FIG. 4) to light red. This can then change to green once the card is correctly seated. (Again, different colours can be used.)

Figure 3:
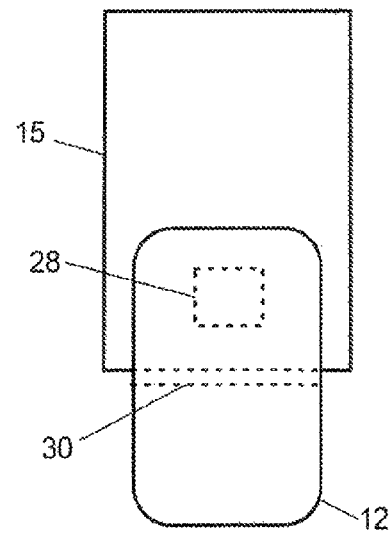
FIG. 3 shows another form of a card-seating arrangement in a reader device as employed in a commercial transaction system in accordance with the present invention.
Figure 4:
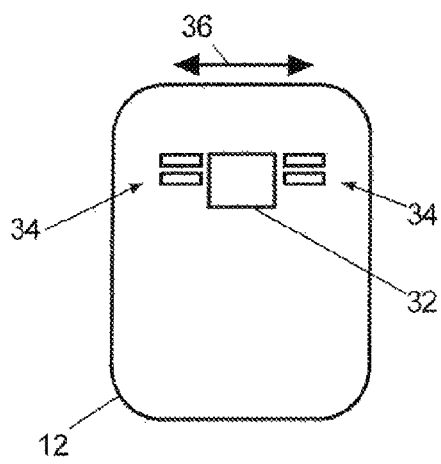
FIG. 4 shows a means for ensuring correct registration between a chip card and the reader device.
Figure 5:
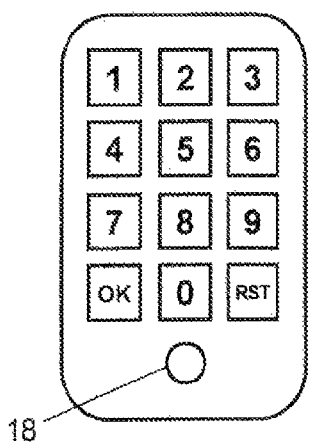
FIG. 5 shows a particular configuration of the keys provided in a reader device.

The use of a narrower reader device 12, as shown in FIG. 3, has the advantage that it allows the device 12 to be somewhat longer. This means that the numeric keys can be arranged in 3 columns and 4 rows with the zero in the middle at the bottom. This is shown in FIG. 5. In this case the OK and RST keys can be located either side of the zero and the LED 18 located at the very bottom, or alternatively at the very top. However, whatever the width of the device 12, the preference is to employ the more traditional 3×4 layout for the keys, for ease of use by the customer.

Although card authorization has so far taken the form of checking the PIN as entered by the customer, an enhanced form of authorized is also envisaged by the present invention. A first such enhanced authorization will now be described.

Most mobile communications devices these days have an inbuilt camera function. This is exploited in this present embodiment. Either before or after the PIN has been checked (preferably afterwards, since the enhanced authorization will not be necessary if the PIN is incorrect), the merchant asks a first-time customer if he minds his photograph being taken. If the customer does not mind, the merchant goes ahead and takes the photograph using the inbuilt camera function. (Alternatively, a user interface may be provided separately for card holders to pre-register an identifying image like a photograph prior to making a transaction, and this photograph will be used as is now being described.) Using the dedicated app on the mobile communications device the merchant then sends the data representing this photographic image to the server, where it is encrypted and stored. Alternatively, the encryption may be carried out by the app on the mobile communications device. Encryption makes sure that the image is not recognisable on the server as a photographic representation of the customer, something which could infringe the right of the customer to his privacy. This image data is stored along with the customer's card information. Then, at a subsequent transaction involving the same card, the merchant, or any other merchant using this same system or any other system linked to this system, retrieves the stored image associated with this card information using the app, and the retrieved image is displayed on the screen of the mobile device 10. The merchant can then form a comparison between the displayed image and the appearance of the customer using the card. Clearly, if the customer is not the original customer (who is assumed to be the rightful owner of the card), then the merchant can assume that a fraudulent transaction is about to take place and can void the transaction.

A variant of this embodiment will now be described.

In this variant, the merchant takes the photo (or uses a pre-registered photo, as mentioned above) and sends it to the server, as just described. However, this time, at the subsequent transaction event involving the same card, the merchant, or any other merchant using this same system or any other system linked to this system, again asks the customer if he minds his photo being taken. If not, the photo is taken and then sent, as before, to the server. At this point the server forms a comparison between this new image and the stored image associated with this particular card information. This comparison can be carried out using face-recognition software provided on the server. The result of this comparison is then sent to the merchant's mobile communication device 10. This result may be in the form of a confidence score (e.g. expressed as a percentage or as a simple scale). From this the merchant understands that there is a scale of confidence in the match between the image of the customer this time round and the image of the customer the first time round. The merchant himself at this point decides whether or not this is a sufficiently good match and acts accordingly. This decision will be based on guidelines issued by the card provider, a bank, the merchant's insurance company or any other party involved in the supply chain.

The app on the mobile communications device may show the match result in a number of ways. For example, the plain numeric figure itself may be displayed. Alternatively, a bar may be displayed having a length that corresponds to the range of score from least to greatest. The resulting indication may also be shown in a different colour, for example, in that bar. At the same time the bar may be divided into at least two different regions: a "good match" region lying above a particular score and a "bad match" figure lying below a particular score. Between the two may be a "possible match" region, which requires the merchant to make a decision as to whether or not to allow the transaction to go ahead. A result in the "good match" or "bad match" regions will normally absolve the merchant from having to make the decision.

A second form of enhanced authorization involves the use of a biometric sensing facility. This may be carried out using the inbuilt hardware (e.g. the camera function or a fingerprint scanner) of the mobile communications device or a separate dedicated sensing device, which is connected to the mobile communications device 10 or to the reader device 12. Either way, this second form of enhanced authorization follows the same steps as the above-described first form of enhanced authorization using a photographic image of the customer, except that in this case an image is formed of a biometric parameter of the customer. This parameter is any convenient characteristic of the customer, for example his thumbprint, palmprint or iris. Like the photographic embodiment, the merchant can either take the customer's thumbprint (for example) the first time round and store it on the server, or the merchant may pre-submit the parameter themselves through some other process, after which at a subsequent transaction using the same card the merchant, or any other merchant using the same system or any connected system, can ask the server to send the thumbprint image to his mobile communications device, upon which the merchant makes a visual comparison between this thumbprint and that of the customer presently before him; alternatively, the merchant can take the customer's thumbprint the first time round and store the data representing the thumbprint it on the server, after which at a subsequent transaction using the same card the merchant can take a new biometric record of the customer presently before him, send that to the server and ask the server to send him the results of an image-recognition match between this new image and the already stored image. In practice the latter option is probably preferable, since it could require special training on the part of the merchant to make a meaningful comparison between the stored biometric image and the newly taken image.

In a yet further embodiment of the commercial transaction system, a customer's card data and biometric are taken at an initial transaction with the merchant, or are pre-submitted by the card holder, and these data are stored in encrypted form on the server. Then, when the same customer wishes to engage in a new transaction with any merchant using this or a connected system, this embodiment allows him to simply present himself to a merchant and have his biometric parameter (e.g. thumbprint) taken again. The app on the mobile communications device then instructs the server to carry out a search for a stored biometric matching the freshly taken one. If the match is sufficiently good, then the server will simply complete the transaction straightway without the customer having to input any PIN number. The advantage of this is that the customer does not have to carry any cards or ID with him. His biometric is sufficient to both authorize and charge a transaction. However, for higher value transactions, the customer may also be required to enter a PIN number or a series of digits from a previously agreed code.

During most transactions it is commonly required for the merchant to ascertain certain personal details of a customer. One convenient way of obtaining such details is as follows.

It is assumed that a customer has carried out an initial transaction with a particular merchant, in which he has been authenticated, e.g. by PIN. At this stage the merchant requests the personal details of the customer. At the same time he may take a biometric image or a photograph of the customer. These details, plus the card data and data representing the biometric image and/or the photographic image are then sent to the server, where they are stored in encrypted form. Now assume that the same customer wishes to make a subsequent transaction with any merchant operating the present system. To obtain the customer's personal details, this merchant merely has to take the biometric image or photograph of the customer and send data representing this to the server. The server than makes a match with the already stored data and returns to the merchant of this subsequent transaction the personal details of the customer associated with that match. This personal information can be used to provide a receipt, guarantee or other purchase-related documentation to the purchaser.

Figure 6:
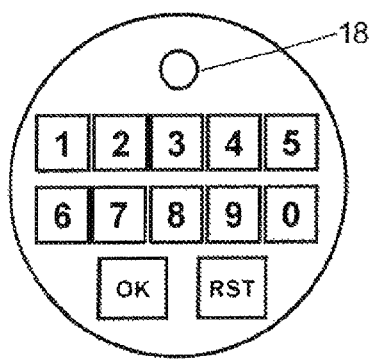
FIG. 6 shows another configuration of the reader device and of the keys provided in the reader device.

Although the reader device 12 has been shown as generally rectangular in shape, other shapes may be used. For example, it may have a round shape, as shown in FIG. 6. Here two rows of 5 digits each constitute the numeric keys, while the OK and RST keys are fitted in at the bottom of the device. The light-emitting element 18 is accommodated at the top. As with the rectangular device, the round device may have a slot accommodating the full width of a card or one accommodating only part of the width of the card. Again, as with the rectangular device, the round device may also be narrowed in width than the card.

The reader device will normally have a rechargeable battery. This can be recharged by connecting the reader device to the mobile communications device, or using a mains or car charger, via a cable. The cable connecting the reader device to the mobile communications device may conveniently have at one end a standard USB plug for mating with the reader device and at the other end a micro-USB plug or other standard or proprietary connection for mating with the mobile communications device.

In order to make the reader device more attractive to merchants, it may be provided with any of a number of different "skins". These will normally have some artistic merit and may include the merchant's own logo, or they may have some functional use, such as providing a more rugged protection, or be slip-proof or waterproof, or have some other advantage.

Earlier the matter of providing feedback of key presses to the card holder and/or merchant was discussed and this was implemented in one embodiment using the light-emitting element 18. An alternative to this is to employ an audible feedback indication. This would normally involve the provision of a small speaker in the reader device, which would tend to increase the size of the device. The same would apply to the provision of a vibratory feedback element, which could be used instead of a speaker. This may or may not be thought to be undesirable. Indeed, one of the advantages of the invention as described hereinabove is that it can occupy a small footprint, even fitting comfortably on a keyring for the merchant to carry with him at all times. For this reason a visual indication of feedback, such as the one described earlier, is to be preferred.

The arrangement described above for ensuring correcting registration between the card and the reader device (see FIG. 4) may be employed not only in the present transaction application involving a mobile communications device and a server, but in any application involving the use of a chip-and-PIN reader device.

It has so far been assumed that the reader device will include the OK button. This has the advantage of allowing PINs of different lengths (e.g. 6 digits) to be entered. However, where it is only necessary to cater for a PIN of a particular length (e.g. 4 digits), then the OK button can be dispensed with and the reader device arranged to automatically start the PIN authentication process immediately a PIN of that particular length has been entered.

Although the embodiments have assumed a wireless link between the reader device and the mobile communications device, this may be replaced by a wired connection. In addition, the reader device may also be equipped to read a magnetic stripe of a magnetic-strip type card. In that case authorization of such a card will be by signature or by the entering of a PIN.

What has been described above is a chip-and-PIN reader device, which can be made small and therefore easily carried around by a merchant, e.g. on a keyring. Assisting in this reduced size of the reader is the fact that in one embodiment the reader may have no display—or at least a display showing a virtual keyboard only. Another embodiment however may include a fully functioning display that may provide a form of branding for the chip-and-PIN reader device when it is turned off or is in a standby state. The keys include the ten numeric keys plus, optionally, an enter ("OK") and a restart ("RST") key. In addition, only one light-emitting element need be included, which can provide an indication of feedback regarding the pressing of the keys and also an indication of a successfully entered PIN and/or a wrongly entered PIN and/or a misaligned card.

The invention claimed is:

1. A chip-and-PIN reader device, comprising:
   a slot for accommodating a chip-and-PIN card;
   a set of electrodes within the slot and adapted to come into contact with corresponding electrodes on the card when the card is inserted into the slot; and
   a means for ensuring correct registration between the electrodes on the card and the set of electrodes of the reader device,
   wherein the means for ensuring correct registration comprises a pair of electrodes on each side of the set of electrodes which are to come into contact with the electrodes on the card with each pair of electrodes being spaced from the set of electrodes and from one another within the slot so that when electrodes of a card are aligned with the set of electrodes of the reader device, the card electrodes do not contact either pair of electrodes of the reader, the reader device being adapted to detect a short-circuit of either of the two pairs of electrodes, due to a chip card electrode being misaligned and contacting either of said pair of electrodes, and to signal said short-circuit to the user of the reader device.

2. A reader device as claimed in claim 1, wherein the slot comprises two
   orthogonally disposed walls of the slot only, against which, in use, the card is pushed by the user of the reader device, said two orthogonally disposed walls further constituting the means for ensuring correct registration.

3. A reader device as claimed in claim 1, wherein the reader device comprises:
   a plurality of numeric keys for entering a PIN number;
   an indicator device, which is adapted to provide feedback to the user of the reader device, indicating that the numeric keys have been pressed correctly, said indicator device being a light-emitting element having two different colours, a first of said colours indicating the successful entering of each digit of the PIN number and a second of said colours indicating a wrong entered PIN number;
   wherein the reader device is configured to signal said short-circuit by the light-emitting element showing the second of the two different colours and/or by a "fail" signal.

4. A reader device as claimed in claim 1, wherein the slot has a width less than that of the card.

5. A reader device as claimed in claim 1, wherein the reader device also comprises a magnetic-strip reader.

* * * * *